United States Patent
Tsai

(10) Patent No.: US 12,269,556 B2
(45) Date of Patent: Apr. 8, 2025

(54) STEM BUFFER SUSPENSION ASSEMBLY STRUCTURE

(71) Applicant: Ming-Ta Tsai, New Taipei (TW)

(72) Inventor: Ming-Ta Tsai, New Taipei (TW)

(73) Assignee: DAH KEN INDUSTRIAL CO., LTD.

( * ) Notice: Subject to any disclaimer, the term of this patent is extended or adjusted under 35 U.S.C. 154(b) by 522 days.

(21) Appl. No.: 17/837,041

(22) Filed: Jun. 10, 2022

(65) Prior Publication Data

US 2023/0399074 A1 Dec. 14, 2023

(51) Int. Cl.
*B62K 21/20* (2006.01)
*B62K 21/14* (2006.01)

(52) U.S. Cl.
CPC .............. *B62K 21/20* (2013.01); *B62K 21/14* (2013.01)

(58) Field of Classification Search
CPC ................................. B62K 21/14; B62K 21/20
USPC .................................................. 280/275, 276
See application file for complete search history.

(56) References Cited

U.S. PATENT DOCUMENTS 5,350,185 A * 9/1994 Robinson ............... B62K 21/20
384/49

FOREIGN PATENT DOCUMENTS

DE 102018002277 A1 * 9/2019 ............. B62K 21/14

* cited by examiner

*Primary Examiner* — Anne Marie M Boehler
*Assistant Examiner* — Felicia L. Brittman-Alabi

(57) ABSTRACT

A stem buffer suspension assembly structure includes a main suspension stem inserted into a stem channel of a front buffer frame assembly and including a buffer assembly, wherein a stem and a headset are assembled on an end of the main suspension stem protruded out of the buffer assembly; an upper end cover assembled with the buffer assembly and abutted with a top of the stem; a lower pressing assembly is assembled with the main suspension stem and includes a lower plug member, a locking pin, a pressing member and a limit block. The lower plug member is assembled on the main suspension stem, and the lower plug member is locked with the locking part, the locking pin is screwed with the pressing member, the limit block is mounted with the locking pin and located between the lower plug member and the pressing member.

9 Claims, 8 Drawing Sheets

STEM BUFFER SUSPENSION ASSEMBLY STRUCTURE

BACKGROUND OF THE INVENTION

1. Field of the Invention

The present invention is related to a stem buffer suspension assembly structure, which is applied to bicycle field to provide an effect of more conveniently and quickly mounting a suspension assembly of a bicycle stem.

2. Description of the Related Art

During a process of assembling a suspension assembly of a bicycle, a fastener is mounted in a stem to stabilize the suspension assembly in the stem, and the faster is called a plum-shaped member; ROC Patent No. M626028 discloses a stem buffer suspension locking structure including a positioning ring member called as a plum-shaped member, and the plum-shaped member must be mounted from a bottom of a stem first, and a special tool is used to knock the plum-shaped member into a preset position, and then a suspension body is inserted into the stem from a top of the stem. However, the conventional method has a problem, that is, it is impossible to check whether a position of the plum-shaped member in the stem is in line with the assembly of the suspension body, so a user must repeat to knock the plum-shaped member to adjust its position, and it is labor-intensive and time-consuming and may even cause depression on an inner wall of the stem or deformation of the plum-shaped member.

SUMMARY OF THE INVENTION

An objective of the present invention is to provide an effect of more conveniently and quickly mounting a suspension assembly of a bike and reducing an assembly operation time for maintenance personnel or assemblers, to solve the above-mentioned conventional problem.

In order to achieve the above-mentioned objective and effect, the present invention provides a stem buffer suspension assembly structure configured to assemble with a stem and a headset, and mount with a front buffer frame assembly disposed on a head stem, wherein an end of the headset is disposed on a bottom end of the stem, and the other end of the headset is mounted with the front buffer frame assembly and stacked on the head stem; the stem buffer suspension assembly structure includes a main suspension stem, an upper end cover and a lower pressing assembly. The main suspension stem is inserted into a stem channel of the front buffer frame assembly and includes a buffer assembly mounted therein, wherein an end of the buffer assembly is protruded out of a top of the main suspension stem, and the stem and the headset are assembled on the end of the main suspension stem protruded out of the buffer assembly. The upper end cover is assembled with the end of the buffer assembly protruded out of the main suspension stem, and the upper end cover is abutted with the top of the stem. The lower pressing assembly is assembled on a bottom of the main suspension stem and includes a lower plug member, a locking pin, a pressing member and a limit block, wherein an end of the lower plug member is assembled on the bottom of the main suspension stem to close the bottom of the main suspension stem, and the lower plug member has a locking part recessed on the other end thereof, an end of the locking pin is locked with the locking part, other end of the locking pin is screwed with the pressing member, the limit block is mounted with the locking pin, and the limit block is located between the lower plug member and the pressing member.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
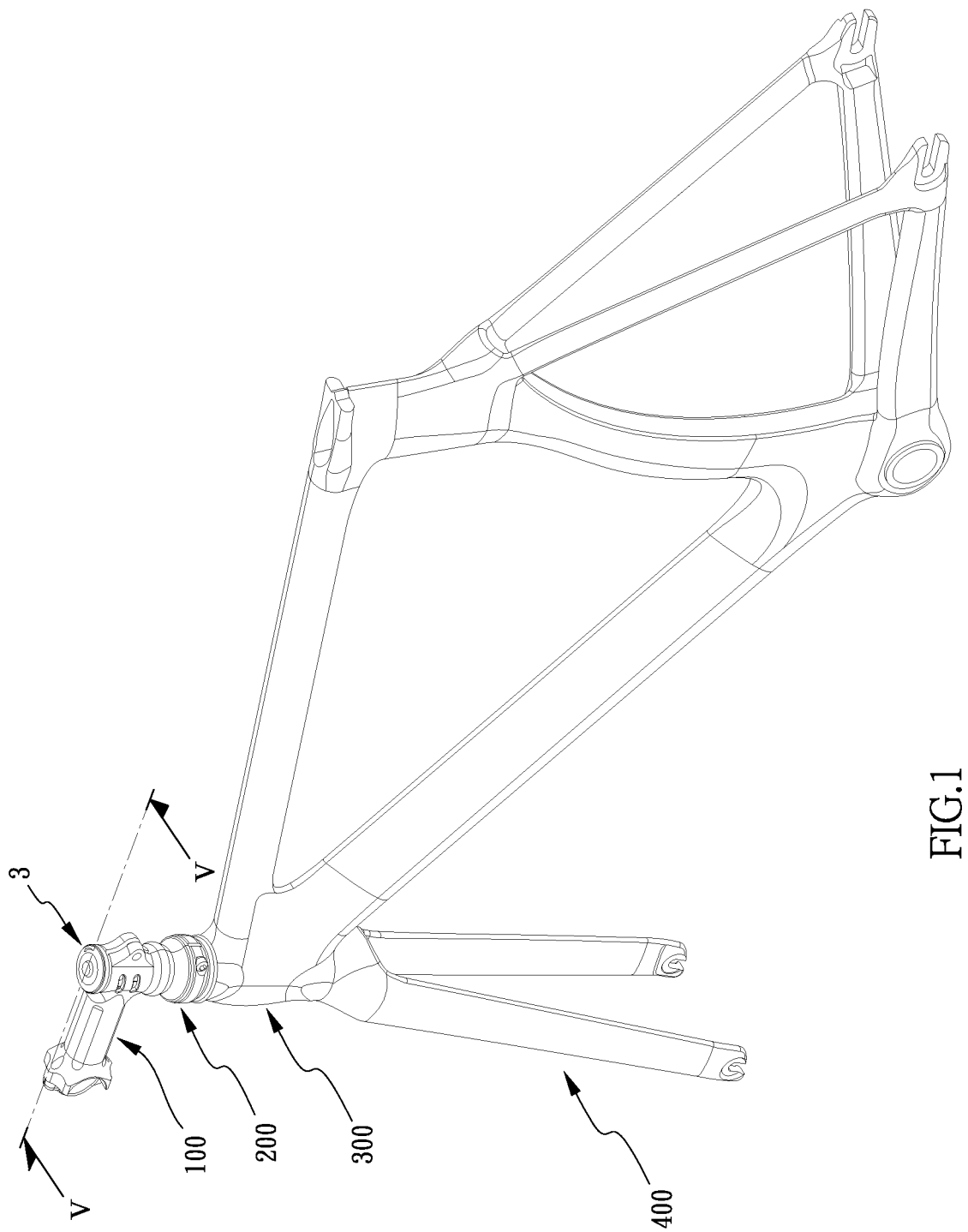
FIG. 1 is a perspective view of a stem buffer suspension assembly structure of the present invention assembled with a stem, a headset, a head stem and a front buffer frame assembly.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 8, which show a stem buffer suspension assembly structure of the present invention. As shown in FIGS. 1 to 8, the stem buffer suspension assembly structure is configured to assemble with a stem 100 and a headset 200, and mount with a front buffer frame assembly 400 disposed on a head stem 300. An end of the headset 200 is disposed on a bottom end of the stem 100 (for example, in FIG. 5, the bottom of the stem 100 is at the right side of the stem 100), and the other end of the headset 200 is mounted with the front buffer frame assembly 400 to stack on the head stem 300. The stem buffer suspension assembly structure includes a main suspension stem 1 inserted in a stem channel 500 of the front buffer frame assembly 400, and the main suspension stem 1 includes a buffer assembly 2 mounted therein. An end of the buffer assembly 2 is exposed out of a top of the main suspension stem 1, and the stem 100 and the headset 200 are assembled with the exposed end of the buffer assembly 2. The stem buffer suspension assembly structure includes an upper end cover 3 assembled with an end of the buffer assembly 2 protruded out of the main suspension stem 1 and abutted with the top of the stem 100, and a lower pressing assembly 4 assembled with a bottom of the main suspension stem 1. The lower pressing assembly 4 includes a lower plug member 41, a locking pin 42, a pressing member 43 and a limit block 44; an end of the lower plug member 41 is assembled on the bottom of the main suspension stem 1 to close the bottom of the main suspension stem 1, and the lower plug member 41 has a locking part 411 recessed on the other end thereof. The end of the locking pin 42 is locked in the locking part 411, other end of the locking pin 42 is screwed with the pressing member 43. In addition, the limit block 44 is mounted with the locking pin 42 and located between the lower plug member 41 and the pressing member 43, the stem 100 and headset 200 are assembled on a top end of the main suspension stem 1, the lower pressing assembly 4 is assembled with the bottom of the main suspension stem 1. The above-mentioned stem 100, the headset 200, the main suspension stem 1 and the lower pressing assembly 4 which are assembled together are directly mounted with the head stem 300 and the front buffer frame assembly 400, so that it is not necessary to adjust a position of the limit block 44, and the maintenance can be simplified and the operation time for mounting can be reduced.

In the process of performing the mounting operation of the present invention, the stem 100 and the headset 200 are mounted with a top end of the main suspension stem 1, and another end of the main suspension stem 1 is assembled with the lower pressing assembly 4 first; the end, where the lower pressing assembly 4 is disposed, of the main suspension stem 1 is then inserted into the stem channel 500 of the front buffer frame assembly 400, so that the parts of the headset 200 and the front buffer frame assembly 400 exposed out of the head stem 300 can be assembled with each other, and the bottom of the headset 200 is abutted with the head stem 300. Next, from an opening of the stem channel 500 at the bottom of the front buffer frame assembly 400, a special tool can be inserted into the front buffer frame assembly 400 to drive the pressing member 43 of the lower pressing assembly 4, to push the limit block 44 to deform, and the limit block 44 is deformed to engaged with an inner wall of the stem channel 500 of the front buffer frame assembly 400, so that the mounting operation of the present invention can be completed quickly and conveniently, and it is no necessary to adjust the position of the plum-blossom-shaped member. As a result, the user just needs to perform the mounting/assembly operation of the present invention once and without repeating operation and adjustment. For one skilled in the art, the disassembly operation is much the same as the above-mentioned assembly operation, the user just needs to screw the pressing member 43 to rotate relatively to the locking pin 42, the pressing member 43 can be released from the locking pin 42 to make the limit block 44 not be pushed by the pressing member 43, so that the stem buffer suspension assembly structure of the present invention, the stem 100 and the headset 200, which are assembled together, can be pulled away from the head stem 300 and the front buffer frame assembly 400; as a result, the proposed structure of the stem buffer suspension assembly structure of the present invention can make the assembly/disassembly operation simpler and quicker.

Figure 5:
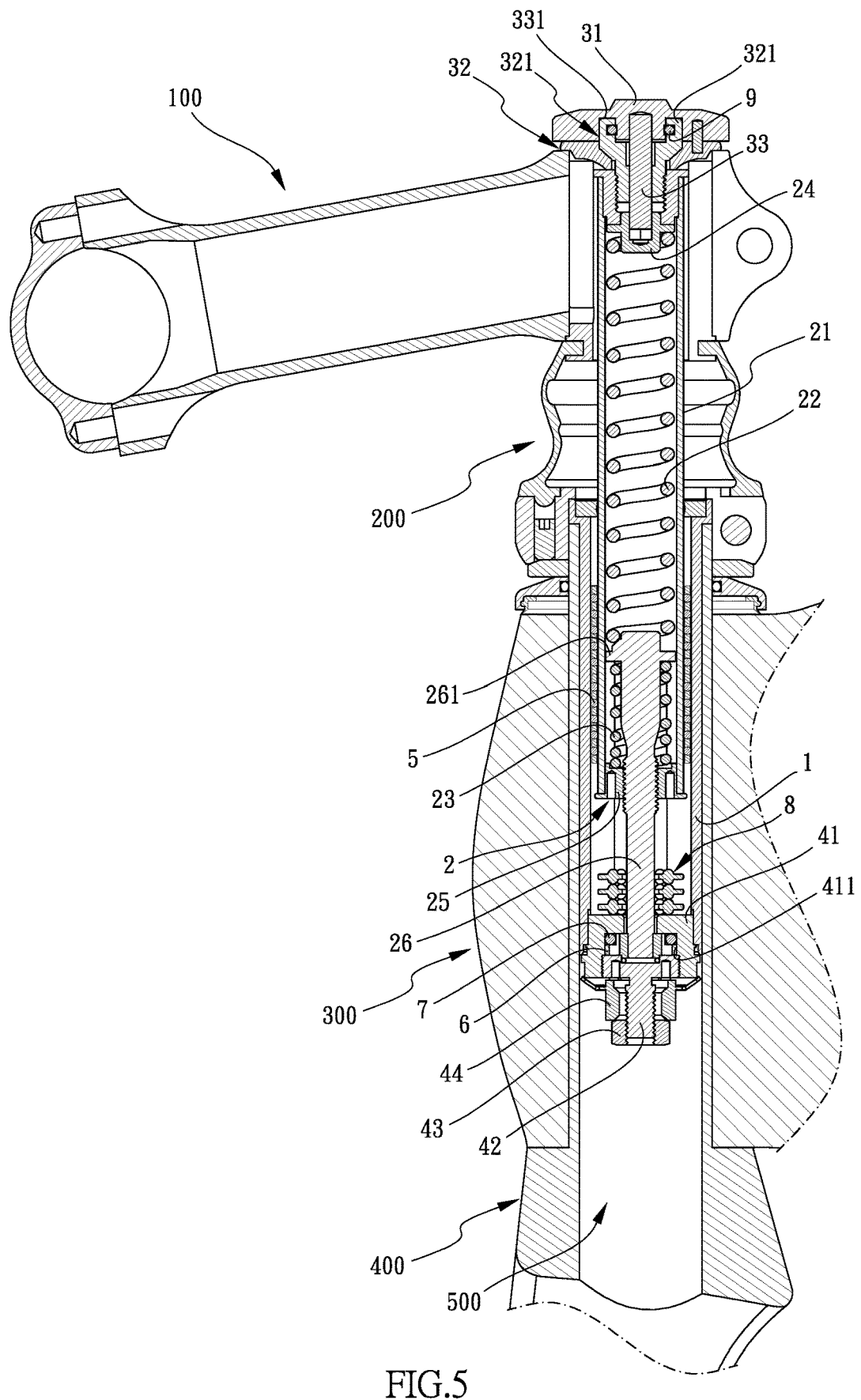
FIG. 5 is a schematic cross-sectional view taken along V-V of FIG. 1.
Figure 6:
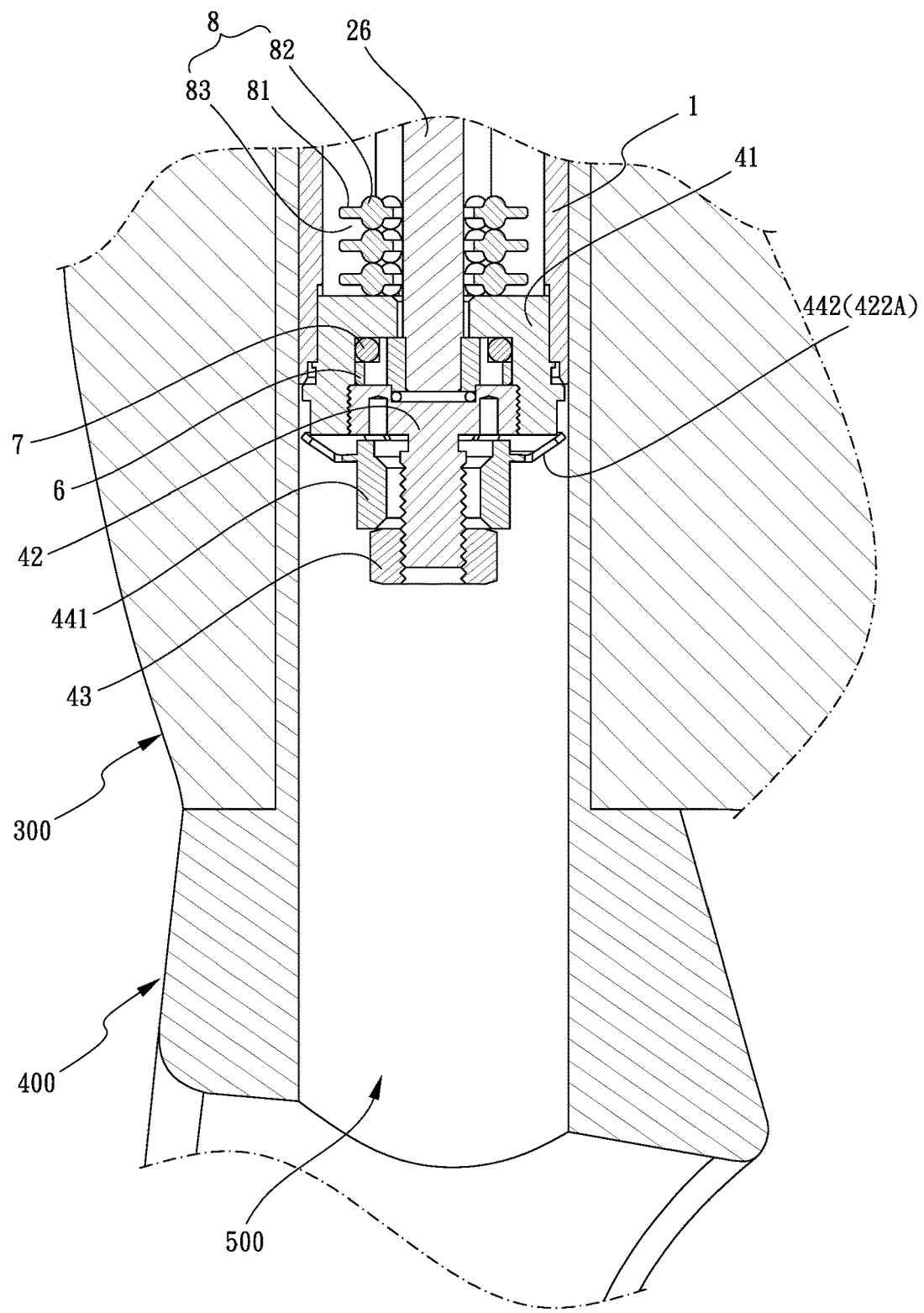
FIG. 6 is an enlarged schematic view of a part of FIG. 5.
Figure 7:
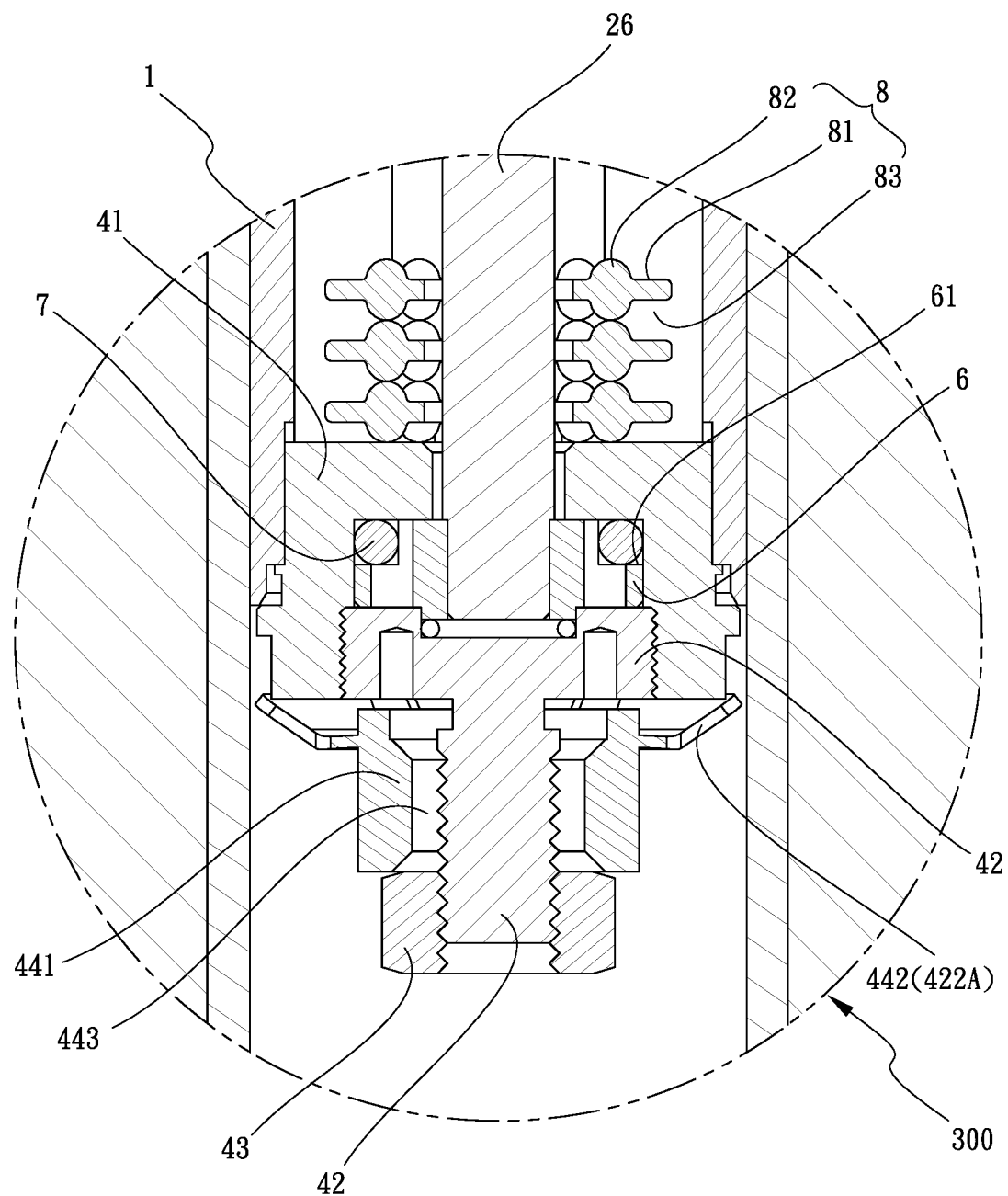
FIG. 7 is an enlarged schematic view of a part of FIG. 6.

Please refer to FIG. 5, the key concept of the present invention is the buffer assembly 2 providing a buffer function to effectively reduce the impact during riding. The buffer assembly 2 further includes an inner stem body 21, a first buffer spring 22, a second buffer spring 23, an upper limit stopper 24, a lower limit stopper 25 and a shaft 26, an end of the inner stem body 21 is inserted into the main suspension stem 1, the upper limit stopper 24 and the lower limit stopper 25 are assembled with a top end and a bottom end of the inner stem body 21, respectively, the shaft 26 is assembled with the lower limit stopper 25, an end of the shaft 26 is disposed inside the inner stem body 21, the other end of the shaft 26 is exposed out of the lower limit stopper 25 to assemble and connect with the lower plug member 41. The shaft 26 has a stop ring plate 261 protruded on an outer periphery of the end thereof disposed in the inner stem body 21, two ends of the first buffer spring 22 are elastically abutted with the upper limit stopper 24 and the upper end surface of the stop ring plate 261, respectively; the second buffer spring 23 is mounted on the shaft 26, and two ends of the second buffer spring 23 are elastically abutted with a lower end surface of the stop ring plate 261 and the lower limit stopper 25, respectively. With the shock absorption effect of the first buffer spring 22 and the configuration of the second buffer spring 23 assisting with the second buffer spring 22, the impact and vibration during riding can be effectively reduced.

Please refer to FIG. 5, at least one bearing 5 can be disposed between the inner stem body 21 and the main suspension stem 1. The at least one bearing 5 is mounted on a peripheral side of the inner stem body 21 and sandwiched between the inner stem body 21 and the main suspension stem 1. With the configuration of the at least one bearing 5, the main suspension stem 1 can have an axial displacement to disperse and reduce impact force and the shock force when the main suspension stem 1 is subjected to the impact force and the shock force. In addition, the limit block 44 assists in stably mounting the main suspension stem 1 and the buffer assembly 2 in the front buffer frame assembly 400. In an embodiment, the limit block 44 can include a shaft part 441 in a cylinder shape and an outer ring part 442 in a petal shape, the shaft part 441 has a through hole 443 passed therethrough a top thereof to a bottom thereof, and the outer ring part 442 is disposed around an outer periphery of an end of the shaft part 441, the outer ring part 442 is formed by a plurality of flap plates 442A disposed in interval and radially extended upwardly. When the pressing member 43 is pressed by the locking pin 42, the pressing member 43 is forced to move toward the limit block to push the shaft part 441, the outer ring part 442 is abutted with the lower plug member 41, and the moving shaft part 441 makes the outer ring part 442 gradually deform and outwardly extend, and the extended outer ring part 442 is gradually abutted against the inner wall of the stem channel 500 of the front buffer frame assembly 400, so that the outer ring part 442 is abutted and fastened with the stem channel 500, and the main suspension stem 1 is prevented from freely moving to impact suspension function.

Figure 8:
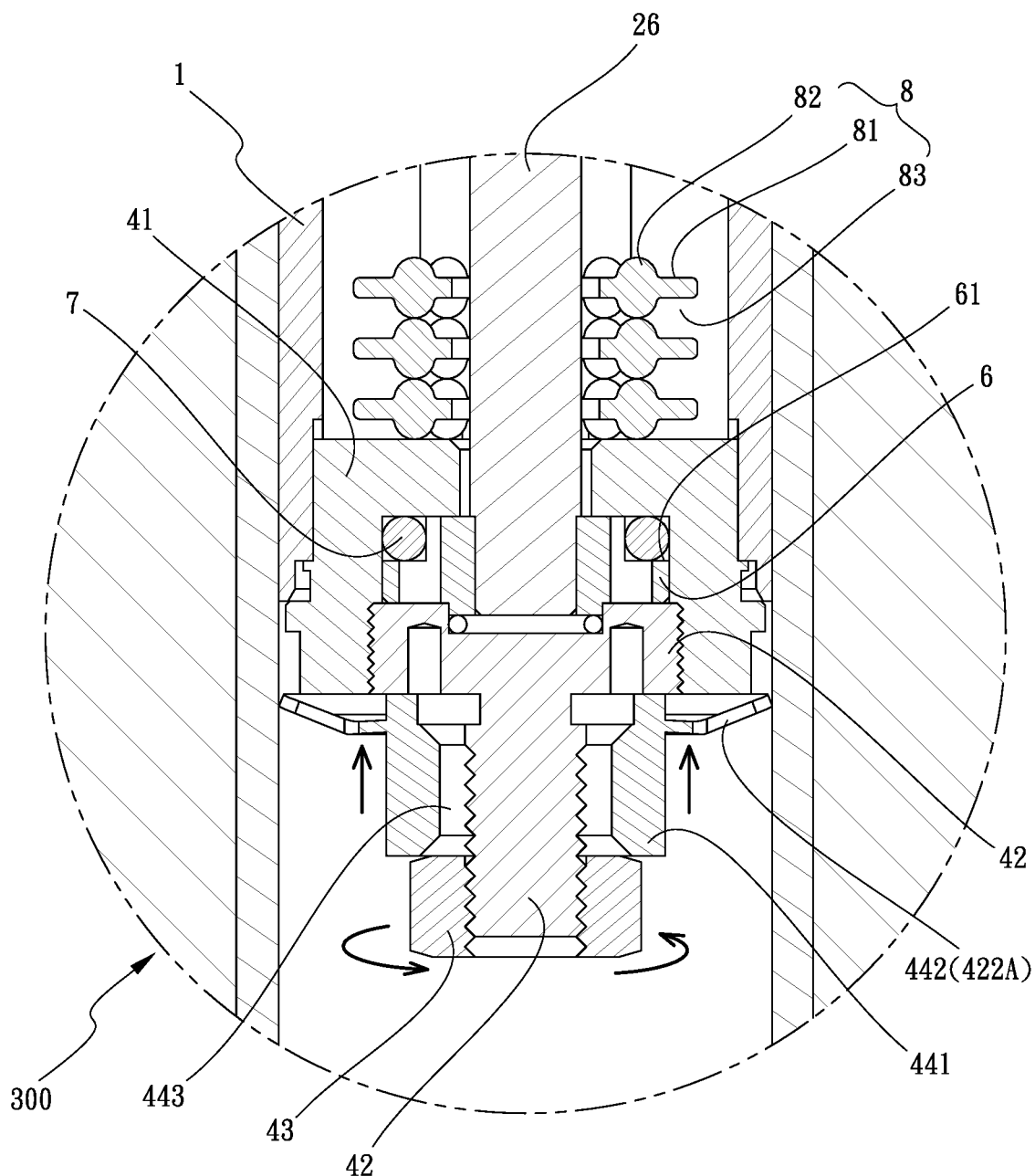
FIG. 8 is a schematic view showing an operation that a limit block is moved and an outer ring part is abutted with an inner wall of a front buffer frame assembly stem channel after a pressing member is locked and pressed with a locking pin in FIG. 7.

In order to make the buffer operation of the main suspension stem 1 smoother, the locking part 411 includes a soft plug 6 and a washer 7 disposed therein, the soft plug 6 is mounted with the shaft 26, and the soft plug 6 is made by elastic plastic and configured to effectively absorb a part of the impact during suspension buffering; the washer 7 is mounted with a step part 61 (as shown in FIG. 8) on a top of the soft plug 6 and abutted with an inner wall of the locking part 411. The step part 61 is recessed around the top of the soft plug 6, the washer 7 is configured to increase friction between the soft plug 6 and the locking part 411, as shown in FIGS. 5 to 8. Furthermore, the end of the shaft 26 exposed out of the lower limit stopper 25 can be mounted with cushions 8, each of the cushions 8 includes buffer plates 81 stacked with each other and elastically deformable, each of the buffer plates 81 has a plurality of bumps 82 respectively protruded at a top surface and a bottom surface thereof, respectively; the bumps 82 of the stacked buffer plates 81 are abutted with each other to form a buffer channel 83 between the adjacent two cushions 8. The cushions 8 is configured to prevent the lower limit stopper 25 and the lower plug member 41 from contacting or impacting with each other during the buffer operation of the stem buffer suspension assembly structure of the present invention, as shown in FIG. 5.

Figure 2:
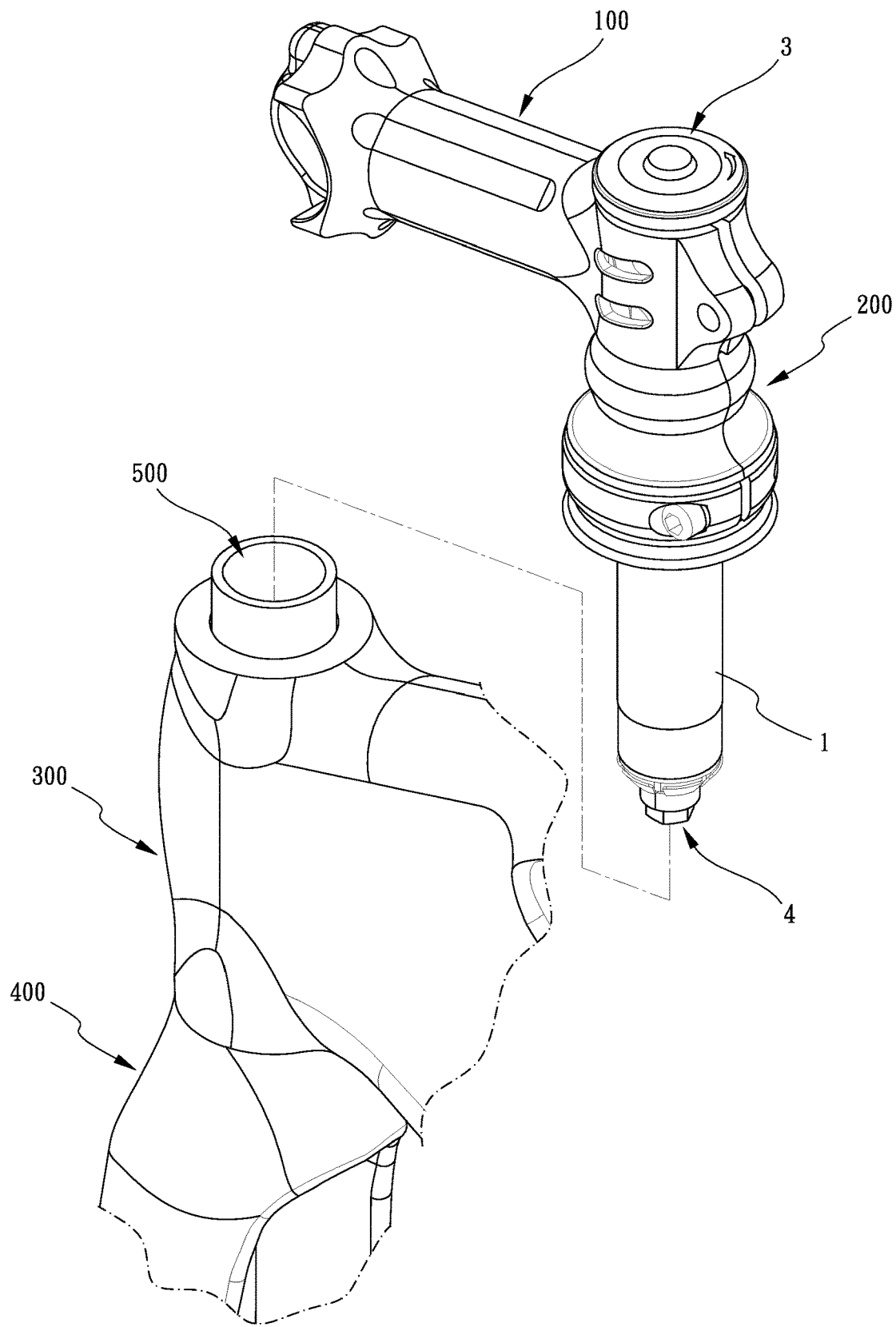
FIG. 2 is an exploded view of a stem buffer suspension assembly structure of the present invention assembled with a stem, a headset, and a head stem and a front buffer frame assembly.
Figure 3:
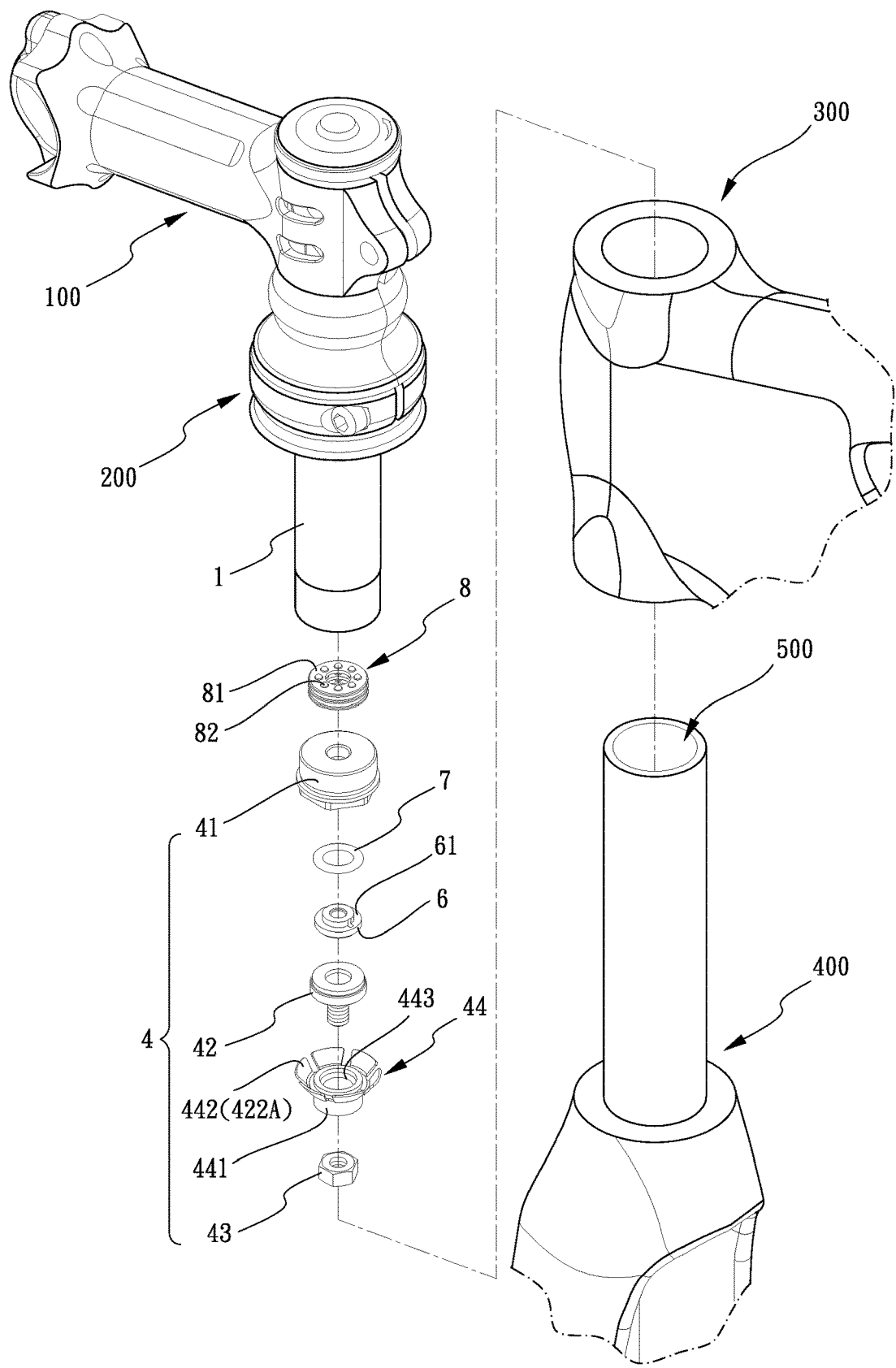
FIG. 3 is an exploded view of details of FIG. 2.
Figure 4:
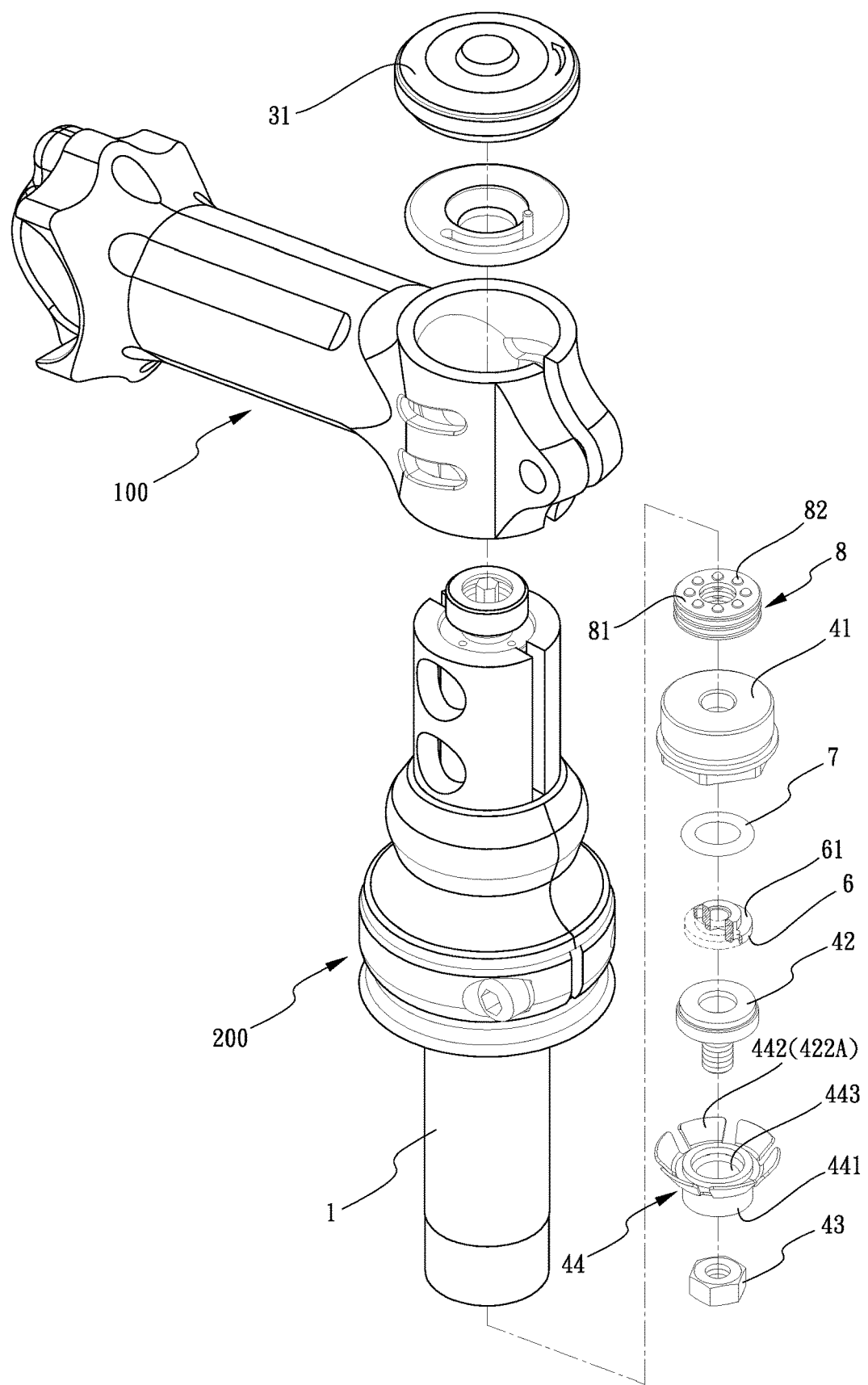
FIG. 4 is an exploded view of a part of FIG. 3.

The upper end cover 3 mainly includes a main end-cover 31, an auxiliary end-cover assembly 32 and a shaft core 33, an end of the auxiliary end-cover assembly 32 is inserted into the inner stem body 21 to connect to the upper limit stopper 24, the other end of the auxiliary end-cover assembly 32 is abutted with the stem 100; the shaft core 33 is passed through the auxiliary end-cover assembly 32, two ends of the shaft core 33 are exposed out of the auxiliary end-cover assembly 32, one of the exposed ends of the shaft core 33 is inserted into and combined with the upper limit stopper 24, the main end-cover 31 is mounted on a top of the auxiliary end-cover assembly 32 and connected to the other of the exposed ends of the shaft core 33. In an embodiment, the auxiliary end-cover assembly 32 has a plug part 321 protruded on a top thereof, and the main end-cover 31 has an engaging part 311 disposed on a bottom thereof, the engaging part 311 of the main end-cover 31 is connected to the plug part 321 of the auxiliary end-cover assembly 32, a cushion ring 9 is disposed between the plug part 321 and the engaging part 311, the main end-cover 31 is assembled with the auxiliary end-cover assembly 32, so that the stem buffer suspension assembly structure of the present invention, the stem 100 and the headset 200 can be stably mounted on the head stem 300 and the front buffer frame assembly 400 to prevent from escaping, and a height position of the lower pressing assembly 4 in the main suspension stem 1 is effectively and reliably limited, as shown in FIGS. 2, 4 and 5.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A stem buffer suspension assembly structure configured to assemble with a stem and a headset, and mount with a front buffer frame assembly disposed on a head stem, wherein an end of the headset is disposed on a bottom end of the stem, and the other end of the headset is mounted with the front buffer frame assembly and stacked on the head stem, the stem buffer suspension assembly structure comprises:

a main suspension stem, inserted into a stem channel of the front buffer frame assembly and comprising a buffer assembly mounted therein, wherein an end of the buffer assembly is protruded out of a top of the main suspension stem, and the stem and the headset are assembled on the end of the main suspension stem protruded out of the buffer assembly;

an upper end cover, assembled with the end of the buffer assembly protruded out of the main suspension stem, wherein the upper end cover is abutted with the top of the stem; and a lower pressing assembly, assembled on a bottom of the main suspension stem and comprising a lower plug member, a locking pin, a pressing member and a limit block, wherein an end of the lower plug member is assembled on the bottom of the main suspension stem to close the bottom of the main suspension stem, and the lower plug member has a locking part recessed on the other end thereof, an end of the locking pin is locked with the locking part, the other end of the locking pin is screwed with the pressing member, the limit block is mounted with the locking pin, and the limit block is located between the lower plug member and the pressing member.

2. The stem buffer suspension assembly structure according to claim 1, wherein the buffer assembly further comprises an inner stem body, a first buffer spring, a second buffer spring, an upper limit stopper, a lower limit stopper and a shaft, the inner stem body is inserted into the main suspension stem, the upper limit stopper and the lower limit stopper are assembled with a top end and a bottom end of the inner stem body, respectively, the shaft is assembled with the lower limit stopper, an end of the shaft is disposed inside the inner stem body, and the other end of the shaft is exposed out of the lower limit stopper to connect to the lower plug member of the lower pressing assembly;

wherein the shaft has a stop ring plate protruded around an end thereof located inside of the inner stem body, two ends of the first buffer spring are elastically abutted with the upper limit stopper and the stop ring plate, respectively, the second buffer spring is mounted on the shaft and two ends of the second buffer spring are elastically abutted with the stop ring plate and the lower limit stopper, respectively.

3. The stem buffer suspension assembly structure according to claim 2, further comprising at least one bearing disposed between the inner stem body and the main suspension stem, wherein the at least one bearing is mounted on a peripheral side of the inner stem body and sandwiched between the inner stem body and the main suspension stem, and the inner stem body mounted with the at least one bearing is axially moved along the main suspension stem.

4. The stem buffer suspension assembly structure according to claim 2, wherein the locking part comprises a soft plug and a washer disposed therein, the soft plug is mounted to the shaft, the soft plug has a step part recessed around a peripheral side of a top thereof, and the washer is mounted to the soft plug and configured to abut with to the step part.

5. The stem buffer suspension assembly structure according to claim 2, wherein the end of the shaft exposed out of the lower limit stopper is mounted with a cushion, the cushion comprises a plurality of buffer plates, the plurality of buffer plates are stacked with each other and elastically deformable, each of the plurality of buffer plates has a plurality of bumps respectively protruded at a top surface and a bottom surface thereof, respectively, the bumps of the stacked buffer plates are abutted with each other to form a buffer channel between the adjacent two cushions.

6. The stem buffer suspension assembly structure according to claim 2, wherein the upper end cover further comprises a main end-cover, an auxiliary end-cover assembly and a shaft core, an end of the auxiliary end-cover assembly is inserted into the inner stem body to connect to the upper limit stopper, the other end of the auxiliary end-cover assembly is abutted with the stem, the shaft core is passed through the auxiliary end-cover assembly, two ends of the shaft core are exposed out of the auxiliary end-cover assembly, one of the exposed ends of the shaft core is inserted into and combined with the upper limit stopper, the main end-cover is mounted on a top of the auxiliary end-cover assembly and connected to the exposed end of the shaft core.

7. The stem buffer suspension assembly structure according to claim 6, wherein the auxiliary end-cover assembly has a plug part protruded on a top thereof, and the main end-cover has an engaging part disposed on a bottom thereof, the engaging part of the main end-cover is connected to the plug part of the auxiliary end-cover assembly, and a cushion ring is disposed between the plug part and the engaging part.

8. The stem buffer suspension assembly structure according to claim 1, wherein the limit block further comprises a shaft part and an outer ring part, the shaft part has a through hole passed therethrough a top thereof to a bottom thereof, the outer ring part comprises a plurality of flap plates disposed in interval and radially extended upwardly, the locking pin is locked with and pressed to the pressing member to push the shaft part to move toward the lower plug member, and the moving shaft part makes the outer ring part gradually abut with the bottom of the lower plug member, and when being pressed by the lower plug member, the outer ring part is gradually deformed to outwardly extend to abut against an inner wall of the stem channel of the front buffer frame assembly.

9. An assembling method of a stem buffer suspension assembly structure, comprising:
  assembling a buffer assembly inside a main suspension stem, wherein an end of the buffer assembly is exposed out of a top of the main suspension stem;
  mounting a stem and a headset on the exposed end of the buffer assembly, and sealing and covering a most top end surface of the exposed end of the buffer assembly by an upper end cover, wherein the upper end cover is abutted with an upper surface of the stem;
  mounting a lower pressing assembly on a bottom of the main suspension stem, wherein the lower pressing assembly comprises a lower plug member, a locking pin, a pressing member and a limit block, an end of the lower plug member is assembled on the bottom of the main suspension stem to close the bottom of the main suspension stem, and the lower plug member has a locking part recessed on the other end thereof, an end of the locking pin is locked with the locking part, other end of the locking pin is screwed with the pressing member, the limit block is mounted with the locking pin and located between the lower plug member and the pressing member;
  inserting the end, where the lower pressing assembly is disposed, of the main suspension stem into a stem channel of a front buffer frame assembly of a head stem, wherein after the end of the main suspension stem is inserted into the stem channel, a headset is abutted with an upper surface of the head stem and connected to the front buffer frame assembly; and
  inserting a special tool into a lower opening of the stem channel of the front buffer frame assembly to drive a pressing member of the lower pressing assembly to push and deform the limit block, so that the limit block is deformed to engage with the inner wall of the stem channel of the front buffer frame assembly, to quickly perform an assembling and mounting operation.

* * * * *